United States Patent [19]

Yamamura et al.

[11] Patent Number: 4,853,853

[45] Date of Patent: Aug. 1, 1989

[54] ELECETRONIC CASH REGISTER

[75] Inventors: Sigeyuki Yamamura, Tenri; Yasuhide Nakamura, Yamatokoriyama, both of Japan

[73] Assignee: Sharp Kabushiki Kaisha, Osaka, Japan

[21] Appl. No.: 185,282

[22] Filed: Apr. 18, 1988

Related U.S. Application Data

[63] Continuation of Ser. No. 795,904, Nov. 7, 1985, abandoned.

[30] Foreign Application Priority Data

Nov. 7, 1984 [JP] Japan ............... 59-168831[U]
Nov. 9, 1984 [JP] Japan ............... 59-170843[U]

[51] Int. Cl.$^4$ ............................... G06F 15/21
[52] U.S. Cl. ........................... 364/405; 364/401
[58] Field of Search ................... 364/405, 401

[56] References Cited

U.S. PATENT DOCUMENTS

| | | | |
|---|---|---|---|
| 2,663,495 | 12/1953 | Ramsell | 364/403 |
| 4,213,179 | 7/1980 | Hamano | 364/405 |
| 4,361,877 | 11/1982 | Dyer et al. | 364/900 |
| 4,398,250 | 8/1983 | Hosono | 364/900 |

FOREIGN PATENT DOCUMENTS

| | | | |
|---|---|---|---|
| 0058803 | 12/1981 | European Pat. Off. | |
| 1549191 | 7/1979 | United Kingdom | 364/403 |

OTHER PUBLICATIONS

Patent Abstracts of Japan, vol. 3, No. 124 (E–144), Oct. 17, 1979.
Patent Abstracts of Japan, vol. 10, No. 76 (P-440), (2133), Mar. 26, 1986.

*Primary Examiner*—Jerry Smith
*Assistant Examiner*—Gail O. Hayes
*Attorney, Agent, or Firm*—Birch, Stewart Kolasch & Birch

[57] ABSTRACT

An electronic cash register comprising a volatile memory for the storage of data concerned with cash registration, a writable non-volatile memory for the storage of the data, and a control for writing the data in the non-volatile memory. The contents stored in the volatile memory can be corrected, if necessary, on the basis of the data stored in the non-volatile memory.

4 Claims, 3 Drawing Sheets

Fig. 3(a)   Fig. 3(b)   Fig. 3(c)
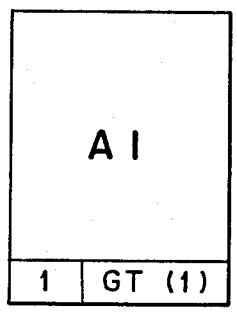 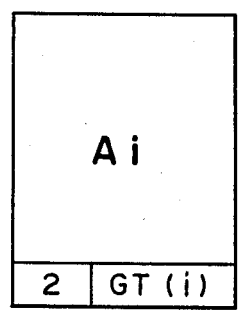 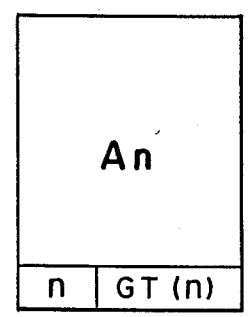
Fig. 4(a)   Fig. 4(b)   Fig. 4(c)
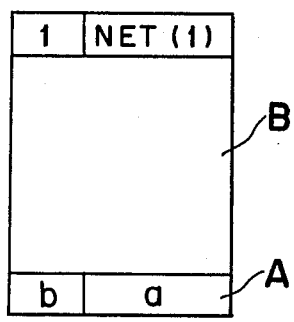 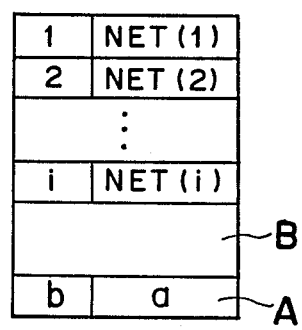 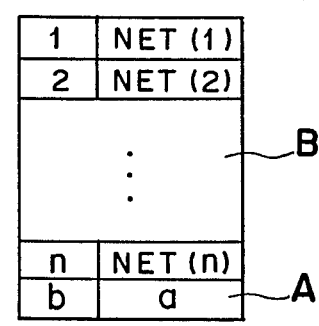

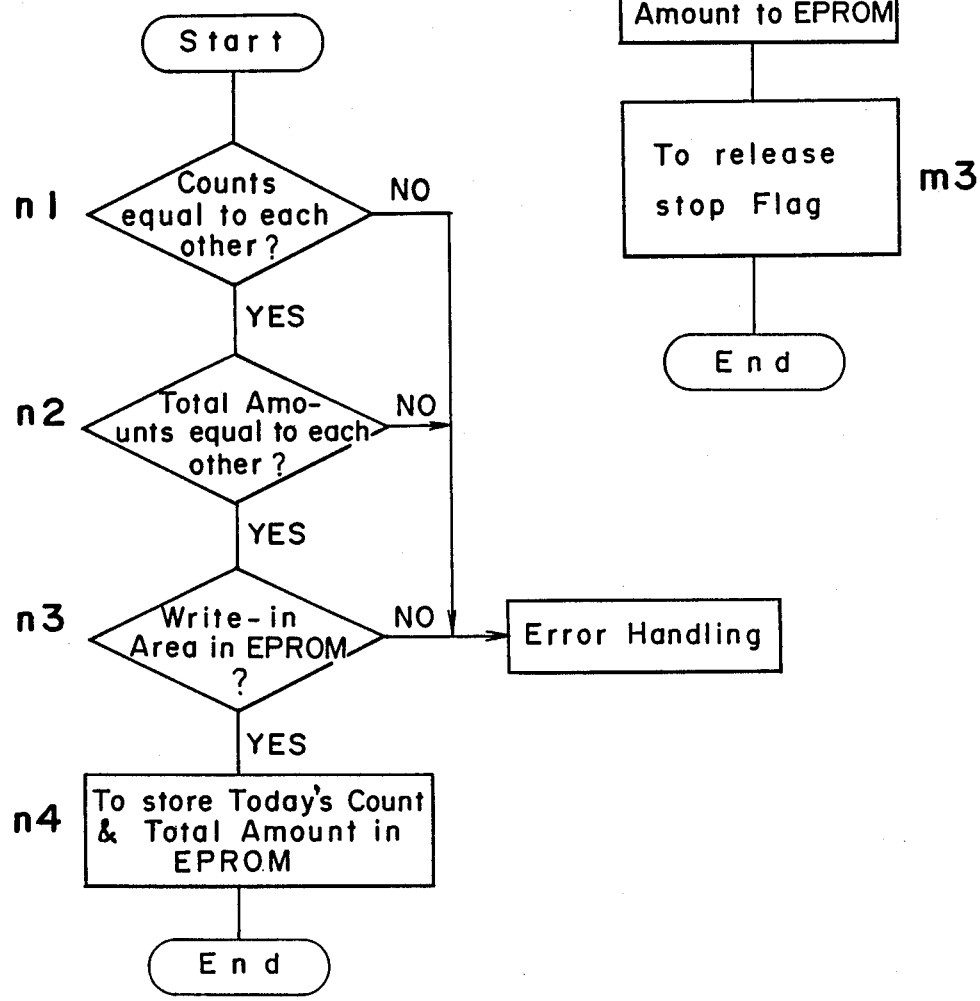

ELECETRONIC CASH REGISTER

This application is a continuation of application Ser. No. 795,904 filed on Nov. 7, 1985 abandoned.

BACKGROUND OF THE INVENTION

The present invention relates to an electronic cash register.

In an electronic cash register, various data associated with the cash registration are stored in a volatile memory that requires the constant supply of electric power. In order that data to be registered for a predetermined period of time, for example, for several days, is stored in the volatile memory, the memory must be powered by electricity even when the cash register is not operated. In the event that the commercial electric power supply is interrupted for any reason, the volatile memory is powered by an auxiliary back-up power source, for example, a battery, to protect the once-stored data from being volatilized.

Since any battery used for the back-up power source for continuously powering the volatile memory has a limited lifetime, and/or for any other reason, it may happen that the volatile memory will no longer be powered. Thus, according to the prior art, there is a problem in that the reliability of the data stored in the volatile memory for a long period of time is not very high.

SUMMARY OF THE INVENTION

The present invention has for its essential object to provide an improved electronic cash register wherein improvement has been made to enable data stored in a memory used therein to be retained assuredly for a long period of time without being destroyed, thereby to increase the reliability of the electronic cash register.

Another important object of the present invention is to provide an improved cash register of the type referred to above wherein the reliability of the data stored in the volatile memory in connection with the cash register is increased.

In order to accomplish these objects, the present invention provides an electronic cash register which comprises a volatile memory for the storage of data concerned with cash registration, a writable non-volatile memory for the storage of the data, a control means for writing the data in the non-volatile memory, means for correcting the contents stored in the volatile memory, on the basis of the data stored in the non-volatile memory, and means for displaying the contents stored in the volatile memory and the contents stored in the non-volatile memory.

With this construction, since the contents stored in the volatile memory can be corrected on the basis of the data stored in the non-volatile memory, the reliability of the contents stored in the volatile memory can be increased. Also, since both of the contents stored in the volatile and non-volatile memories, respectively, can be displayed, the contents stored in the respective memories can readily be confirmed.

Moreover, the present invention provides an electronic cash register which comprises a volatile memory for the storage of data concerned with cash registration, a writable non-volatile memory, detachably mounted in the cash register and having a data area for storing information associated with said data and a code area for storing identification codes, and a processing means for correcting the contents, stored in the volatile memory, on the basis of the information stored in the non-volatile memory, and operable to, in the event that no identification code is stored in the code area, storing a predetermined identification code in the code area to write data in the data area and to, in the event that the identification code is stored in the code area, compare the stored identification code with the predetermined code, data being written in the data area only when the stored identification code coincides with the predetermined code.

With this construction, since no data is written in the data area of the non-volatile memory when the identification code stored in the code area of such non-volatile memory does not coincide with the predetermined code stored in ROM 6, the reliability of the contents stored in the volatile memory is increased.

BRIEF DESCRIPTION OF THE DRAWINGS

These and other objects and features of the present invention will become clear from the following description taken in conjunction with a preferred embodiment thereof with reference to the accompanying drawings, in which:

FIGS. 3(a), 3(b) and 3(c) are an explanatory diagram used for the explanation of contents to be stored in a random-access memory;

FIGS. 4(a), 4(b) and 4(c) are an explanatory diagram used for the explation of contents to be stored in the erasable programmable read-only memory;

FIG. 5 is a flowchart showing the sequence of operation necessary to determine if the contents stored in the random-access memory are correct; and FIG. 6 is a flowchart showing the sequence of operation of a central processing unit in the even that the contents stored in the random-access memory are not correct.

DETAILED DESCRIPTION OF THE EMBODIMENT

Figure 1:
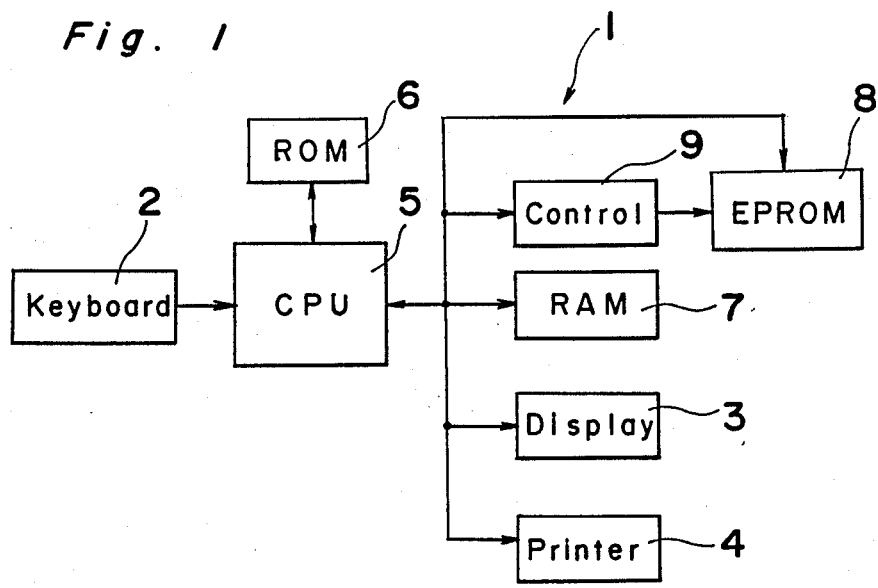
FIG. 1 is a block diagram showing the circuitry of an electronic cash register.

Referring first to FIG. 1 an electronic cash register, generally identified by 1, is provided with a keyboard input device 2 for entering instructions associated with the registration and adjustment of money, a display unit 3 for displaying numerical figures inputted from the keyboard 2, and a printer unit 4 for printing data on a paper slip or the like. A central processing unit 5, hereinafter referred to as CPU, performs a procedure according to a program, stored in a read-only memory (ROM) 6, when instructed by the command from the keyboard input device 2 and operates to store the result of the procedure in a random-access memory (RAM) 7 which is a volatile memory.

In accordance with the present invention, there is provided in association with CPU 5, an erasable programmable read-only memory (hereinafter referred to as "EPROM") 8 which is a writable non-volatile memory, and a control unit 9 for controlling the write-in operation of EPROM 8 so that the result of the daily adjustment performed after the transaction of money for a particular day can be written in EPROM 8.

Figure 2:
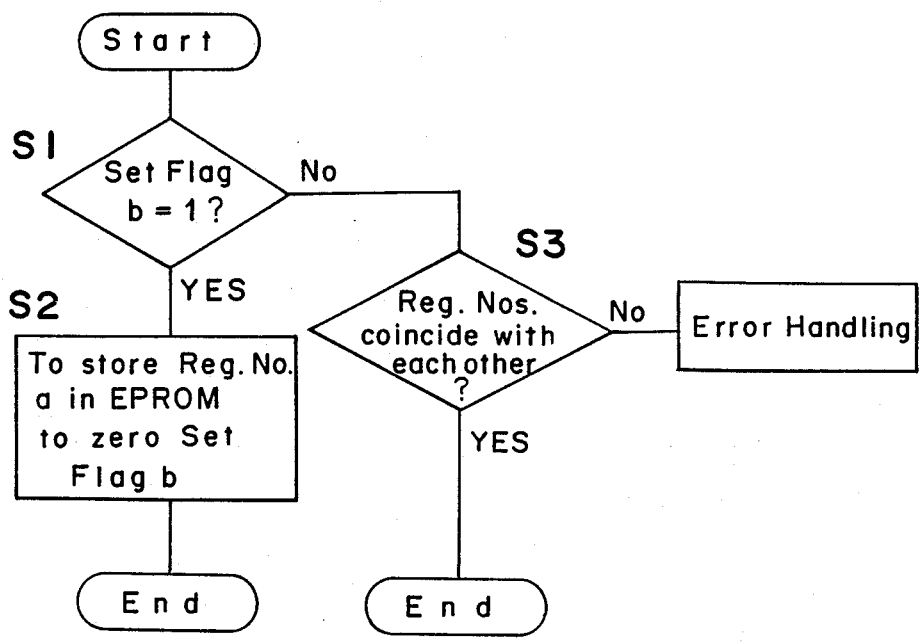
FIG. 2 is a flowchart showing the sequence of operation necessary to avoid any erroneous write-in of data in an erasable programmable read-only memory when the latter has been substituted for an erasable programmable read-only which has been utilized.

EPROM 8 is detachably provided in the above described system and can be replaced with another EPROM when the whole write-in areas of the first-used EPROM 8 have been occupied. Because of this, according to the present invention, in order to prevent data from being written in such another EPROM when the first-used EPROM has been replaced, the sequence of operation is carried out according to a flowchart shown in FIG. 2. ROM 6 stores a predetermined identification code, for example, a character "a", beforehand, and the same character as the character "a" has to be registered in EPROM 8. In this case, as shown in FIG. 2, a decision is made at step s1 to determine if the character "a" has been registered in EPROM 8. This decision is carried out by a set flag b in a code area A (shown in FIG. 4) of EPROM 8. If the set flag b is "1", it is determined that the character "a" has not been registered, but if it is "0", it is determined that the character "a" has been registered. In the event that the set flag is "1", the predetermined character "a" stored in ROM 6 is stored in EPROM 8 at step s2. On the other hand, in the event that the set flag b is "0", a decision is made at step s3 to determine if the character stored in ROM 6 coincides with that stored in EPROM 8. If the result of decision at step s3 indicates that the characters in ROM 6 and ERPOM 8 coincide with each other, such data as will be described later are stored in a data area B (shown in FIG. 4) of EPROM 8, but if it indicates that they do not coincide with each other, an error handling procedure is carried out. The error handling procedure includes, for example, the display, by means of the display unit 3, of information indicative of non-coincidence of the characters and, during this procedure, the operator has to remove the EPROM 8 from the system and connect another EPROM 8 in which the character "a" is written.

Hereinafter, contents stored in RAM 7 and EPROM 8 will be described. Let it be assumed that the counter value representative of a predetermined period of time during which the daily adjustment of sales is carried out is expressed by n, and a counter value representative of the number of times the daily adjustment has been carried out is expressed by i. It is also assumed that the daily amount of sales determined by the daily adjustment for each day is expressed by NET(i) and the total of the amounts of sales during the predetermined period is expressed by GT(i). These parameters have a particular relationship expressed by the following equation:

$$GT(i) = \sum_{i=1}^{i} NET(i) \quad (1)$$

FIG. 3 illustrates the contents stored in RAM 7, and FIG. 4 illustrates the contents stored in EPROM 8. On the first day of the predetermined period, data A1 representative of the sales transaction for this day is stored in RAM 7 as shown in FIG. 3(a) and, on the basis of this data, the total GT(1) and the amount NET(1) are calculated for this day. As shown in FIG. 3(a), the total GT(1) is stored in RAM 7, and as shown in FIG. 4(a), the total NET(1) is stored in EPROM 8. At this time, the counter value "1" is also stored in both of RAM 7 and EPROM 8. On the i-th day during the predetermined period, the amount NET(i) for this day is calculated on the basis of the data Ai and is then stored in EPROM 8 as shown in FIG. 4(b). The total GT(i) for this day, which is the sum of the amount NET(i) and the total GT(i−1) for the preceding day is stored in RAM 7 as shown in FIG. 3(b). Within EPROM 8, the counter value i is stored in association with the amount NET(i), and within RAM 7, the counter value i−1 stored therein is incremented by one and is then stored. On the n-th day during the period, the amount NET(n) is calculated on the basis of the data An for this day and is stored in EPROM 8 as shown in FIG. 4 (c). Then, the total GT(n) which is the sum of the amount NET(n) for this day and the total GT(n−1) calculated until the preceding day, is stored in RAM 7 as shown in FIG. 3(c). Within the EPROM 8, the counter value n is stored in association with the amount NET(3), and within RAM 7, the counter value n−1 for the preceding day is incremented by one and the counter value n is stored.

The contents stored in RAM 7 and EPROM 8 in the manner as hereinabove described can be outputted to one or both of the display and printer units 3 and 4 by manipulat-ing the keyboard unit 1. By way of example, the display of the amounts NET(1) ... NET(n) and the counter values 1 ... n stored in EPROM 8 can be effected by setting a mode selector switch, provided in the keyboard unit 2, in a position, for example, a check mode position, at which the contents stored in EPROM 8 can be outputted, keying in a required period and finally keying in to command the outputting of the contents in EPROM 8.

When the daily amounts NET(i) of sales are summed and stored in EPROM 8, a decision is made to determine if the contents stored in RAM 7 are correct. A flowchart necessary to achieve this decision is shown in FIG. 5, it being to be noted that the following description made with reference to FIG. 5 is associated wit the procedure to be done on the i-th day of the predetermined period.

Referring to FIG. 5, at step n1, the counter value for the preceding day stored in RAM 7 is checked against the counter value i−1 for the preceding day stored in EPROM 8. If the result of the decision at step n1 indicates that the counter values stored in RAM 7 and EPROM 8 coincide with each other, the program flow proceeds to the next step n2, but if it indicates that they do not coincide, the error handling procedure is performed as will be described later. At step n2, a decision is made to determine if the respective values of the amounts NET(1) ... NET(i−1) stored in EPROM 8 coincide with the total GT(i−1) stored in RAM 7 which had been calculated until the preceding day. If the total GT(i) is found coinciding, the next succeeding step n3 takes place, but if it is found not coinciding, the error handling procedure is performed. At step n3, a decision is made to determine if there is a write-in area in EPROM 8. If the result of decision at step n3 indicates that there is a write-in area in EPROM 8, the program flow proceeds to step n4, but if it indicates that there is no write-in area in ERPOM 8, the error handling procedure is performed. During the error handling procedure, the lack of the write-in area in EPROM 8 is displayed and this problem can be overcome when the operator expands ERPOM 8. At step n4, the counter value i for the particular day and the amount NET(i) are stored in ERPOM 8.

On the other hand, when the counter values have been found not coinciding with each other at step n1 indicating that the contents stored in RAM 7 are incorrect, or when the values have been found not coinciding with each other at step n2 indicating that the total GT(i−1) stored in RAM 7 is incorrect, the error handling procedure is performed to set a stop flag for bringing the cash register to a halt. Once the stop flag is set, the electronic cash register is blocked out with no input received thereby. Should the contents of RAM 7 be incorrect, the operator has to perform a master reset. The master reset is a procedure required to re-open the suspended procedure.

FIG. 6 illustrates a flowchart for the error handling procedure to be followed when the contents stored in RAM 7 are incorrect. The master reset is carried out by depressing a reset key arranged in the keyboard unit 2. When the reset key is depressed, CPU 5 commands ERPOM 8 to transfer the counter value $i-1$, stored in EPROM 8, to RAM 7 thereby modifying the counter value stored in RAM 7. At step m2, the total GT(i) which is the sum of the amounts NET(1) . . . NET(i) stored in ERPOM 8 is transferred to RAM 7 and the total stored in RAM 7 is modified accordingly. At step m3, the stop flag is released, allowing the cash register to assume its normal operation.

As hereinbefore described, since whether or not the contents stored in RAM 7 are correct is determined on the basis of the contents stored in EPROM 8, a correct procedure can be continued with high reliability even though the contents stored in RAM 7 are changed or destroyed. Thus, since the identification code of the non-volatile memory loaded in the system can be checked and the contents stored in the volatile memory can be confirmed, the reliability of the contents of the volatile memory can be increased.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electronic cash register comprising
   a volatile memory including means for the storage of the total amount of sales from the first day of a period through the i-th day of the period, to thereby give a storage of the gross amount of sales for this period,
   a non-volatile memory including means for the storage of said total amount of sales for the first day of the period and for the storage of the total amount of sales for each day until the i-th day,
   means for correcting said gross amount of sales stored in said volatile memory to coincide with a summation of the total amounts of daily sales stored in said non-volatile memory if these amounts do not coincide upon comparing said gross amount and said summation, and
   means for displaying data stored in said volatile memory and data stored in said non-volatile memory.

2. An electronic cash register as recited in claim 1, wherein a counter is also stored with each sales total stored in said volatile memory and a counter is also stored with each daily sales total stored in said non-volatile memory, and said counters are compared.

3. An electronic cash register as recited in claim 1 further comprising
   means for storing a predetermined first identification code,
   said non-volatile memory including a code area having means for storing a second identification code,
   means operable to, in the event that no identification code is stored in said code area, store said first identification code as said second identification code in said code area,
   means operable to, in the event that there is a second identification code stored in said code area, compare said second identification code with said first identification code,
   and data means for storing data in said non-volatile memory only when said first identification code and said second identification code coincide.

4. An electronic cash register as recited in claim 3, wherein said means for storing a predetermined identification code is a read-only memory (ROM).

* * * * *